(No Model.)
J. J. McTIGHE.
APPARATUS FOR MANUFACTURING LAMP BLACK.
No. 346,168. Patented July 27, 1886.
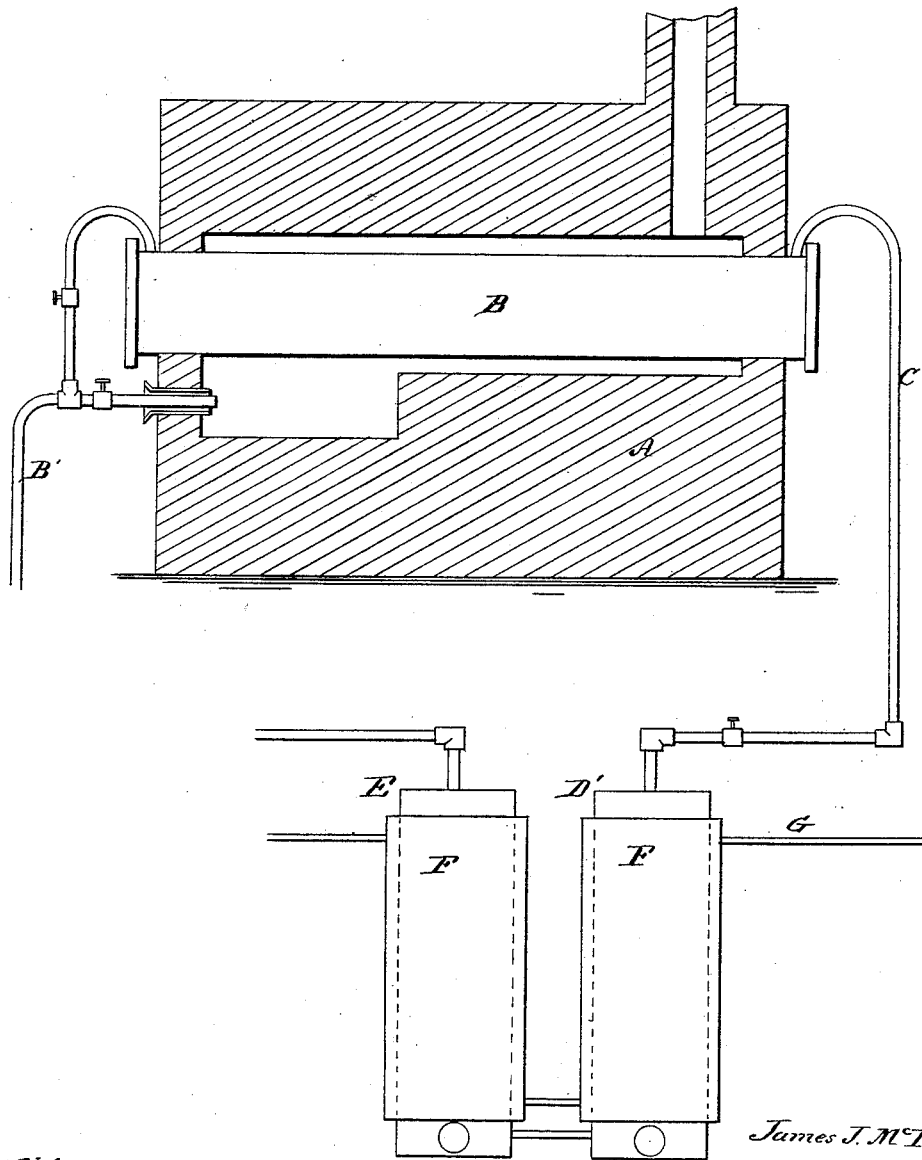
Witnesses
Jno. B. Connolly
A. A. Connolly
James J. McTighe
Inventor
By Connolly Bros & McTighe
Att'ys

UNITED STATES PATENT OFFICE.

JAMES J. McTIGHE, OF PITTSBURG, PENNSYLVANIA.

APPARATUS FOR MANUFACTURING LAMP-BLACK.

SPECIFICATION forming part of Letters Patent No. 346,168, dated July 27, 1886.

Application filed December 7, 1883. Serial No. 113,832. (No model.)

*To all whom it may concern:*

Be it known that I, JAMES J. McTIGHE, of Pittsburg, in the county of Allegheny and State of Pennsylvania, have invented certain new and useful Improvements in Apparatus for Producing Carbon-Black; and I do hereby declare that the following is a full, clear, and exact description of the invention, which will enable others skilled in the art to which it appertains to make and use the same, reference being had to the accompanying drawing, which forms a part of this specification, in which is represented a vertical central section of an apparatus embodying my invention.

This invention has relation to the manufacture of lamp-black or carbon-black, or, more definitely, carbon in a flocculent or floury condition, as distinguished from carbon in the form of coke or graphite.

Heretofore in the production of carbon-black it has been usual to obtain the same by incomplete or imperfect combustion of hydrocarbon vapor, a flame or flames being made to strike against the under surface of a pan or shallow trough containing water, and the product of the imperfect or retarded combustion in the form of lamp-black collected on said surface. The lamp-black so obtained is always of an excessively dry character, distinguished by its deep velvety blackness, and when thoroughly dried and ready to be used as an article of commerce or industry slightly repellent of oils or other mediums with which it is to be mixed to produce paints, inks, &c. The usual process above referred to is, at its best, crude and imperfect, and is not only comparatively slow and tedious, but is, moreover, wasteful, since much of the vapor which ought to be precipitated is carried off and lost.

In experimenting with hydrocarbon vapors I have discovered that imperfect combustion, or, in fact, any kind of combustion of the vapor, is unnecessary for the production of carbon in a floury or flocculent condition, but that the same may be produced in a close vessel and as a result of the decomposition of hydrocarbon vapor, and that when so produced the supply is excessively copious and without waste; and, furthermore, that when the flocculent carbon or "carbon-black" is so obtained it possesses peculiar properties, among which may be mentioned an affinity for oils, rendering it perfectly available for the formation of paint and other compounds without grinding.

The carbon-black resulting from my process is of an unctuous character, (due, I believe, to the presence of oil in small quantity,) perceptible to the touch, easily distinguishable in appearance from carbon-blacks otherwise produced.

My invention consists in the novel construction of an apparatus for producing the carbon-black above described—that is, an apparatus wherein a hydrocarbon vapor (preferably the natural gas issuing from a gas-well) is decomposed, and while under such form is led into one or more depositing-chambers, which are cooled externally by water-jackets or other means, and by the cooling action a precipitate formed of the carbon.

In the accompanying drawing I have shown a simple form of apparatus embodying my invention, wherein A designates a furnace structure containing a retort, B, of refractory material, and means for heating the same. A pipe, B', from a suitable source of supply—such as a gas-well—leads into said retort and supplies it with the hydrocarbon vapor. An outlet-pipe, C, leads from the retort and communicates with a tank or chamber, D', which may in turn have a tubular connection with one or a series of similar tanks or chambers, E, &c. Each of the tanks or chambers D' E is surrounded by a water-jacket, F, and the latter supplied with water through a supply, G, so as to cause a circulation of cold water through the water-chambers, for the purpose of keeping the tanks cool. If desired, however, any other means of cooling the depositing-tanks may be employed.

In making the carbon-black the retort is first brought to a high heat, and afterward the hydrocarbon vapor admitted. Decomposition ensues and coke is formed on the inside of the retort. The escape gases are carried thence to the depositing-chambers, wherein, by reason of the sudden cooling thereof, a precipitate of fine flocculent carbon is obtained, which is afterward removed.

Having now described the form of apparatus best adapted for carrying out my process, I may state that I do not herein claim said pro- cess, broadly, nor the product of said process, as the same will constitute the subject of a separate application.

What I claim is—

1. An apparatus for the manufacture of carbon-black, comprising a depositing or condensing chamber, with means for cooling the same, in combination with a retort or device wherein hydrocarbon vapor may be decomposed.

2. In an apparatus for producing carbon-black from hydrocarbon-vapors, the combination, with a retort wherein the vapors are decomposed, of a communicating chamber or tank wherein the liberated carbon is precipitated, substantially as described.

3. In an apparatus for producing carbon-black, the combination, with a retort or chamber wherein the carbon is set free, of a closed condensing chamber or tank wherein the liberated carbon is condensed or precipitated, substantially as described.

In testimony that I claim the foregoing as my own I have hereto affixed my signature in presence of two witnesses.

JAMES J. McTIGHE.

Witnesses:
D. E. DAVIS,
T. J. McTIGHE.